US008156140B2

(12) United States Patent
Roshen et al.

(10) Patent No.: US 8,156,140 B2
(45) Date of Patent: Apr. 10, 2012

(54) SERVICE ORIENTED ARCHITECTURE ENTERPRISE SERVICE BUS WITH ADVANCED VIRTUALIZATION

(75) Inventors: Waseem A. Roshen, Hilliard, OH (US); Nadeem Malik, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 12/625,250

(22) Filed: Nov. 24, 2009

(65) Prior Publication Data

US 2011/0125776 A1 May 26, 2011

(51) Int. Cl.
*G06F 17/30* (2006.01)

(52) U.S. Cl. ......... 707/769; 707/613; 707/770; 707/781

(58) Field of Classification Search ........................ None
See application file for complete search history.

(56) References Cited

U.S. PATENT DOCUMENTS 5,274,806 A 12/1993 Hill
6,023,701 A * 2/2000 Malik et al. ........................... 1/1
6,438,556 B1 * 8/2002 Malik et al. ................ 348/384.1
6,519,585 B1 2/2003 Kohli
6,961,937 B2 11/2005 Avvari et al.
7,124,062 B2 10/2006 Gebhart
7,321,919 B2 1/2008 Jacobs et al.
7,634,462 B2 12/2009 Weyand et al.
7,676,460 B2 3/2010 Morgan
7,676,462 B2 3/2010 Kirkland et al.
7,676,472 B2 3/2010 Kurhekar et al.
7,693,829 B1 4/2010 Alshawi
2002/0052948 A1 * 5/2002 Baudu et al. .................. 709/224
2002/0174262 A1 * 11/2002 Marcos et al. ................ 709/315
2004/0064554 A1 4/2004 Kuno et al.
2004/0186831 A1 9/2004 Hiratsuka et al.
2004/0236780 A1 * 11/2004 Blevins et al. ................ 707/102
2005/0065920 A1 3/2005 He et al.
2005/0114306 A1 5/2005 Shu et al.
2005/0278410 A1 * 12/2005 Espino .......................... 709/201
2006/0248176 A1 * 11/2006 McDowall et al. ........... 709/223
(Continued)

FOREIGN PATENT DOCUMENTS

EP 1855218 A2 11/2007
(Continued)

OTHER PUBLICATIONS

U.S. Appl. No. 12/174,944, filed Jul. 17, 2008, Roshen.

(Continued)

*Primary Examiner* — Frantz Coby
(74) *Attorney, Agent, or Firm* — Schmeiser, Olsen & Watts; John R. Pivnichny

(57) ABSTRACT

A method and apparatus for discovering services in a service registry. When an enterprise service bus receives a service request, the enterprise service bus determines whether the service name in the request exists in a service registry. If not, the enterprise service bus parses the service name into constituent words, obtains synonyms for each constituent word, and constructs new service names using the synonyms in the same word order as the constituent words in the service name. The enterprise service bus determines whether the constructed service names exist in the registry. If so, the enterprise service bus obtains an address of a service provider application associated with the constructed service name in the registry and sends a request for the service matching the constructed service name to the service provider application.

20 Claims, 5 Drawing Sheets

U.S. PATENT DOCUMENTS

| | | | | |
|---|---|---|---|---|
| 2006/0265508 | A1 | 11/2006 | Angel et al. | |
| 2007/0033167 | A1 | 2/2007 | Basu et al. | |
| 2007/0162421 | A1 | 7/2007 | Pang et al. | |
| 2007/0263534 | A1 | 11/2007 | Pavlick | |
| 2008/0059486 | A1 | 3/2008 | Pappas | |
| 2008/0069124 | A1 | 3/2008 | Patrick | |
| 2008/0086370 | A1 | 4/2008 | Narayanaswami et al. | |
| 2008/0091670 | A1 | 4/2008 | Ismalon | |
| 2008/0120380 | A1* | 5/2008 | Boyd et al. | 709/206 |
| 2008/0133508 | A1 | 6/2008 | Jiang et al. | |
| 2008/0208835 | A1 | 8/2008 | Sauls et al. | |
| 2008/0250097 | A1* | 10/2008 | Angelini et al. | 709/202 |
| 2008/0306751 | A1 | 12/2008 | Conroy et al. | |
| 2009/0018998 | A1* | 1/2009 | Patten et al. | 707/3 |
| 2009/0049040 | A1 | 2/2009 | Fay et al. | |
| 2009/0063522 | A1 | 3/2009 | Fay et al. | |
| 2009/0070456 | A1 | 3/2009 | Brown et al. | |
| 2009/0089078 | A1 | 4/2009 | Bursey | |
| 2009/0089277 | A1 | 4/2009 | Cheslow | |
| 2009/0125332 | A1 | 5/2009 | Martin | |
| 2009/0132698 | A1 | 5/2009 | Barnhill, Jr. | |
| 2009/0144262 | A1 | 6/2009 | White et al. | |
| 2009/0144266 | A1 | 6/2009 | Bicioglu | |
| 2009/0193096 | A1 | 7/2009 | Boyer et al. | |
| 2009/0210408 | A1 | 8/2009 | Boyer et al. | |
| 2009/0222429 | A1 | 9/2009 | Aizebud-Reshef et al. | |
| 2009/0235167 | A1 | 9/2009 | Boyer et al. | |
| 2010/0017387 | A1 | 1/2010 | Roshen | |
| 2010/0017405 | A1 | 1/2010 | Roshen | |
| 2010/0036838 | A1 | 2/2010 | Ellis | |
| 2010/0042590 | A1 | 2/2010 | Smyros et al. | |

FOREIGN PATENT DOCUMENTS

| | | | |
|---|---|---|---|
| WO | 2006110684 | A2 | 10/2006 |
| WO | 2006113092 | A2 | 10/2006 |
| WO | 2008078366 | A1 | 7/2008 |

OTHER PUBLICATIONS

U.S. Appl. No. 12/175,552, filed Jul. 18, 2008, Roshen.

Roshen, Dr. Waseem, "Service Registry with Advanced Search Capability, Part 1: Concepts, Process, and Components", Internet Article Dated Nov. 6, 2009, pp. 1-9, retrieved from the Internet Jan. 11, 2011.

Balani, Naveen, "Model and Build ESB SOA Frameworks", Internet Article Dated Mar. 15, 2005, pp. 1-4, retrieved from the Internet Jan. 12, 2011.

International Search Report for PCT/EP2010/066559, Dated Jan. 27, 2011.

Office Action (Mail Date Oct. 27, 2010) for U.S. Appl. No. 12/174,944, filed Jul. 17, 2008; Confirmation No. 9687.

Office Action (Mail Date Nov. 8, 2010) for U.S. Appl. No. 12/175,552, filed Jul. 18, 2008; Confirmation No. 1797.

U.S. Appl. No. 12/945,151, filed Nov. 12, 2010; Confirmation No. 7151.

U.S. Appl. No. 12/945,337, filed Nov. 12, 2010; Confirmation No. 7540.

Response (Filed Jan. 21, 2011) to Office Action (Mail Date Oct. 27, 2010) for U.S. Appl. No. 12/174,944, filed Jul. 17, 2008; Confirmation No. 9687.

Response (Filed Jan. 31, 2011) to Office Action (Mail Date Nov. 8, 2010) for U.S. Appl. No. 12/175,552, filed Jul. 18, 2008; Confirmation No. 1797.

Notice of Allowance (Mail Date Feb. 11, 2011) for U.S. Appl. No. 12/175,552, filed Jul. 18, 2008; Confirmation No. 1797.

U.S. Appl. No. 13/039,368, filed Mar. 3, 2011; Confirmation No. 1759.

Lausen et al.; Survey of Current Means to Discover Web Services; Semantic Technology Institute (STI) Aug. 2008; 15 pages.

Ahmadi et al.; Flexible Matching and Ranking of Web Service Advertisements; Nov. 2007; 22 pages.

Mokhtar et al.; Interoperable Semantic & Tyntactic Service Matching for Ambient Computing Environments; Aug. 2008; 11 pages.

Bai et al.; Resource Matching and a Matchmaking Service for an Intelligent Grid; International Conference on Computational Intelligence 2004; 4 pages.

Corrales et al.; BeMatch: A Platform for Matchmaking Service Behavior Models; Mar. 2008; 5 pages.

Medjahed et al.; Composing Web Services on the Semantic Web; The VLDB Journal (2003); pp. 333-351.

Nawaz et al.; SEMREG-PRO: A Semantic based Registry for Proactive Web Service Discovery using Publish-Subscribe Model; Fourth International Conference on Semantics, Knowledge and Grid, IEEE 2008; pp. 301-308.

Notice of Allowance (Mail Date Mar. 22, 2011) for U.S. Appl. No. 12/174,944, filed Jul. 17, 2008; Confirmation No. 9687.

Papazoglou et al., "Service Oriented Architectures: Approaches, Technologies and Research Issues", VLDB Journal, Springer Berlin / Heidelberg,vol. 16, No. 3, Jul. 2007, pp. 389-415(27).

Soto-Carrion et al., "General Ontology Service Engine (GORSE): a new approach to integrate the semantic web knowledge on service oriented architectures", pp. 1-22 retrieved Nov. 2009 http://www.imai-software.com/openlab/data/GORSE_DRAFTv0__1.pdf.

"osESB Documentation, Part 1: The SOA Stack and the ESB", Nov. 5, 2007, pp. 1-22 http://www.osesb.org/documentation/The%20SOA%20Stack%20and%20the%20ESB.pdf.

Pohlsen et al., "A Concept for a Medical Device Plug-and-Play Architecture based on Web Services", pp. 1-7, retrieved Oct. 20, 2009 http://sigbed.seas.upenn.edu/archives/2009-07/SchlichtingSIGBED.pdf.

Office Action (Mail Date Jan. 3, 2012) for U.S. Appl. No. 12/945,337—Filing Date Nov. 12, 2010.

Onstine et al.; Build SOA with Web services using WebSphere Studio, Part 1: Introduction to SOA nad Web services, Website, Internet Article, Nov. 11, 2004, Whole document, Retrieved from the Internet: URL: http://www.ibm.com/developerworks/webservices/tutorials/ws-soa-1/ for U.S. Appl. No. 12/945,337—Filing Date Nov. 12, 2010.

* cited by examiner

400

```
public Class NameParser {

    public static ArrayList parseName ( String example) {

        String s = example;
        int  i = s.length();
        int l = 0;
        char c = null;

        ArrayList list = new ArrayList();
        String subString = "";
        char c = null;

        for ( int k = 0; k < i; k++)
        {
            c = s.charAt (k);
            if ( c < 'A' )
            {
                subString = subString + c;
            }
            else

            {
                list.add (l subString);
                l++;
                subString = "" + c;
            }
        }

        list.add(l, subString);

        return list;
    }
}
```

| | 508 | 510 | |
|---|---|---|---|
| 502 | CAR | VEHICLE | AUTOMOBILE |
| 504 | VEHICLE | CAR | AUTOMOBILE |
| 506 | AUTOMOBILE | CAR | VEHICLE |

FIG. 5

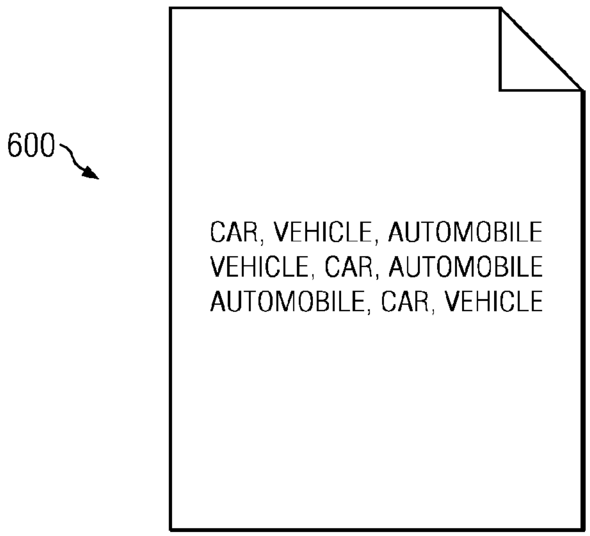

```
public class NameComposer {
  public static ArrayList composeName ( ArrayList list1, ArrayList, list2, ... ) {
    ArrayList composedNames = new ArrayList ();
    Iterator list 1_Iterator = list1.iterator();
    Iterator list 2_Iterator = list2.iterator();
        .....
        ....
    while ( list1_Iterator.hasNext() && list2_Iterator.hasNext () ....)
    {
        String serviceName = "" + list1_Iterator.next() + list2_Iterator.next() + ...;
        composedNames.add (serviceName);
    }
    return composedNames;
  }
}
```

702 (Iterator declarations through while statement)

704 (String serviceName … composedNames.add)

*FIG. 7*

SERVICE ORIENTED ARCHITECTURE ENTERPRISE SERVICE BUS WITH ADVANCED VIRTUALIZATION

BACKGROUND

1. Field

The disclosure relates generally to an improved data processing system and service oriented architectures. More specifically, the disclosure relates to a computer implemented method, data processing system, and computer program product for enabling an enterprise service bus to discover, from a registered service name in a service request, all services in a service registry that provide a service equivalent to the service name in the request.

2. Description of the Related Art

A Service Oriented Architecture (SOA) is a collection of services that communicate with one another over a network in order to carry out business processes. Communication in a service oriented architecture can involve the simple passing of data or can involve two or more services that coordinate some activity. Such services are loosely coupled (meaning that one application does not need to know the technical details of another application in order to communicate with the other application), have well-defined platform independent interfaces, and are reusable. In general, a service-oriented approach enables one or more businesses to link together fragmented data and business processes in order to create a more complete view of operations.

A service in a service oriented architecture is a function which can be invoked via an implementation-independent interface. A service provider is an entity that offers a service to other entities, and an entity that makes use of a service by triggering its execution is a service requestor. A service oriented architecture provides flexibility by allowing a service requestor to discover and invoke a service dynamically based on the pre-published service interface (i.e., the description of the functionality provided by the service). A service request may be processed by one of multiple possible service providers. An intermediary, such as an Enterprise Service Bus (ESB), typically determines the particular service provider implementation to be used to process the request. The enterprise service bus is used to connect applications so that the functionality and data owned by one application can be shared across all applications connected to the enterprise service bus.

SUMMARY

According to one embodiment of the aspects of the disclosure, a computer implemented method, data processing system, and computer program product are provided for enabling an enterprise service bus to discover, from a registered service name in a service request, all services in a service registry that provide a service equivalent to the service name in the request. The enterprise service bus receives a request for a service from a service consumer application. The enterprise service bus determines a service name specified in the service request and queries the service registry for the service name. Responsive to a determination that the service registry does not contain a service matching the service name, the enterprise service bus parses the service name in the service request into at least one constituent word. The enterprise service bus obtain synonyms for each constituent word and constructs new service names using the synonyms in the same word order as the constituent words in the original service name. The enterprise service bus then queries the service registry for the constructed service names. If a service matching the constructed service name is located in the service registry, the enterprise service bus obtains an address of a service provider application associated with the constructed service name in the service registry and sends a request for the service matching the constructed service name to the service provider application.

BRIEF DESCRIPTION OF THE SEVERAL VIEWS OF THE DRAWINGS

FIG. 4 illustrates example code utilized by a name parser component of the enterprise service bus in accordance with the illustrative embodiments;

FIG. 5 illustrates an example dictionary database table utilized by a dictionary lookup component of the enterprise service bus in accordance with the illustrative embodiments;

FIG. 6 illustrates an example dictionary file utilized by a dictionary lookup component of the enterprise service bus in accordance with the illustrative embodiments;

FIG. 7 illustrates example code utilized by a name composer component of the enterprise service bus in accordance with the illustrative embodiments.

DETAILED DESCRIPTION

Figure 1:
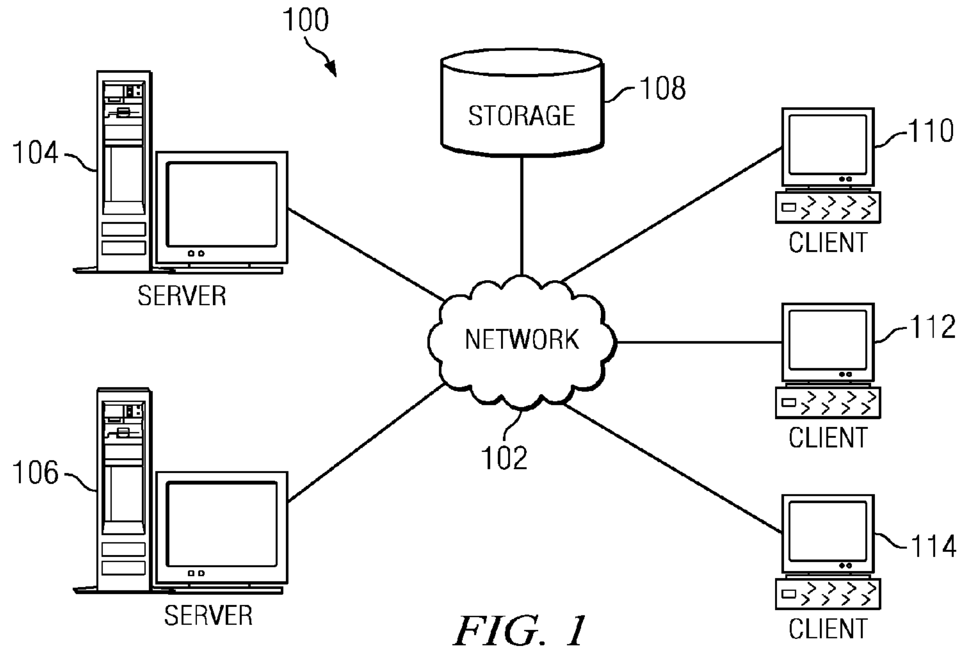
FIG. 1 depicts a pictorial representation of a distributed data processing system in which the illustrative embodiments may be implemented.

As will be appreciated by one skilled in the art, aspects of the disclosure may be embodied as a system, method or computer program product. Accordingly, aspects of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the aspects of the disclosure may be written in any combination of one or more programming languages, including an object oriented programming language such as Java, Smalltalk, C++, Voice eXtensible Markup Language (VXML) or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The aspects of the disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
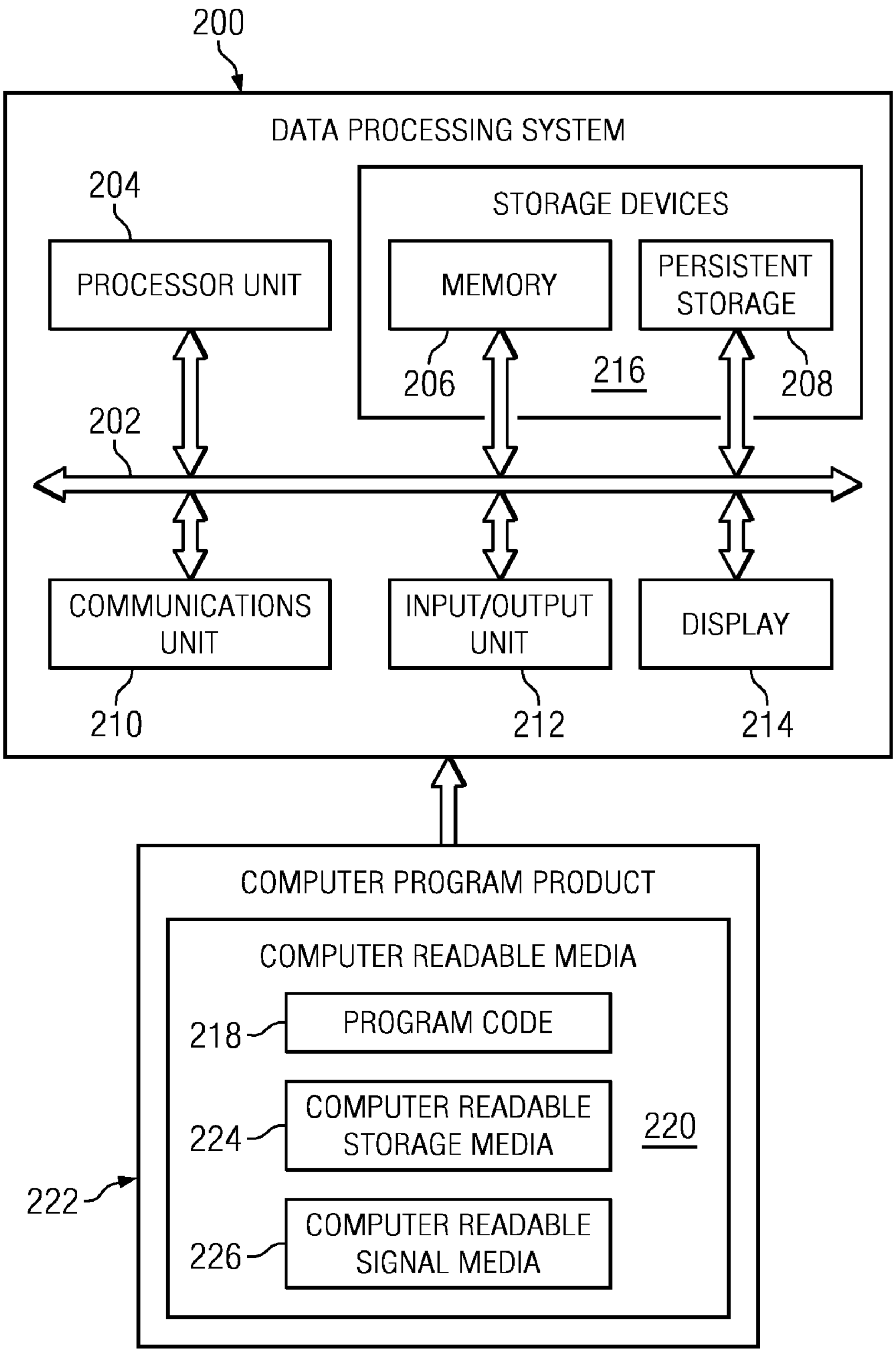
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a distributed data processing system in which the illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is depicted in accordance with the illustrative embodiments. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems, in which a main processor is present with secondary processors on a single chip.

As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The World Wide Web Consortium (W3C), which is the main international standards organization for the World Wide Web, has defined a "web service" as a software system designed to support interoperable machine-to-machine interaction over a network. That is, web services may refer to web-based applications that interact with other web-based applications in order to provide a desired service. For example, application software on a user's desktop computer may send messages via the Internet to a stock quote server in order to retrieve current stock quotes for selected stocks. The application software may then display the retrieved information within the application for the user. Other examples of common web services include banking, currency converters, airplane flight schedule lookups, auction services and language translation services.

In a service oriented architecture providing web services, an enterprise service bus is a distributed software architecture implemented from a collection of middleware services which provides integration capabilities over a network. Middleware is a family of computer software that permits the interconnection, usually over a network, of disparate software components or applications possibly running across heterogeneous computing platforms. A middleware is often used to support complex distributed applications such as web servers, application servers, content management systems, and more generally to support all the software products and tools part of the information technology (IT) system of any modern large enterprise, company and organization. Use of a middleware is also recognized as a solution to the problem of linking new applications to older legacy systems.

An enterprise service bus provides highly scalable and flexible software to connect applications in service oriented architecture-based enterprise integration. The enterprise service bus acts as an intermediary between disparate applications and enables the applications to communicate and send data back and forth to each other. For example, an application that requests a service may be referred to as the service consumer application, and an application that provides the requested service may be referred to as the service provider application. The request from the service consumer application may be received by the enterprise service bus, which allows the applications to communicate by transforming and routing messages between the applications. The enterprise service bus may replace all direct contact with the applications on the bus, so that all communication among applications takes place via the bus. For instance, when the enterprise service bus receives a service request message from one application, it routes the message to the appropriate provider application.

The flexibility of the enterprise service bus allows for easily adding or removing a service consumer or provider application from the integrated structure. This flexibility is possible due to virtualization of service consumers and providers in an enterprise service bus-enabled integrated system. Service virtualization means that the service consumer does not need to know particular information about the service provider and the service provider does not need to know particular information about the service requester. For example, by virtualizing a service provider, a service consumer requesting a service does not need to know the address (e.g., Internet Protocol (IP) address and port) of the service provider to obtain the service. Virtualization of the service provider is possible due to a core functionality of an enterprise service bus that allows the enterprise service bus to route a service request based on the context/content of the incoming service request. This content/context typically comprises the name of a service, or "service name". A service name is an alias for a service provided by a service provider, such as the service name "getCarPrice" for a service that obtains the price of a car. Once the enterprise service bus determines the service name from an incoming service request, the enterprise service bus accesses a service registry to look up the address of the service provider associated with the service name. The enterprise service bus may then route the service request to the service provider having the identified address.

Currently, service registries require the enterprise service bus to know the exact name of a service in order to route the service request to an appropriate service provider, which in turn requires the service consumer to know and request the exact service name. These requirements force a strong coupling between developers of the service consumer applications and the service provider applications, as there must be a direct or indirect service information communication between the developers. This strong coupling is contrary to the principle of Service Oriented Architecture, which promotes loose coupling between the service provider side and the service consumer side. In addition, it can be difficult for existing enterprise service busses to look up a service in a registry because words usage may be different in different geographic area. For example, the word "elevator", commonly used in the United States, is replaced by the word "lift" in the United Kingdom. Even within the same area, different words with the same meaning can be used alternately. For example, for the commonly used word "get", one can also use the words "fetch" or "obtain". Similarly, instead of the commonly used word "car", one can also use the word "automobile" or "vehicle".

Another problem existing enterprise service busses may encounter when trying to locate a service in a service registry is that if the enterprise service bus does not know the exact name of the service, the enterprise service bus does not have the ability to determine or guess the name of the service, and therefore discover the service description. Thus, the service consumer developer cannot incorporate this service into his code until the service provider developer completes his work on the service and informs directly or indirectly the service consumer developer the specific service name with which the provider developer has chosen to register the service with the registry. This inability of the enterprise service bus to determine the service name will usually result in delay of the development of consumer applications for a given service.

Yet another problem existing enterprise service busses may encounter when trying to locate a service in a service registry is that the inability to discover a service definition without knowing the exact service name hinders the portability of consumer service applications. For instance, consider different car manufacturers, such as General Motors, Ford, Toyota, Mazda, etc. Each of these manufacturers may develop a service that allows user to obtain the price of a car, and each manufacturer names this same service in an obvious but slightly differently manner, using service names such as "getCarPrice", "getVehiclePrice", "getAutomobilePrice", "obtainCarPrice", "fetchVehiclePrice", etc. Having different names for essentially the same service means that, with existing enterprise service busses, separate service consumer applications would be needed for each of the manufacturers.

The illustrative embodiments provide a solution to these problems by adding functionality to the enterprise service bus which allows the enterprise service bus to determine and construct all other possible service names that may be equivalent to and replaceable with the service name specified in a service request. An equivalent service name is a service name that comprises synonyms of the original service name and that in effect provides the same or substantially similar function as the original service name. This proposed functionality may be used when the enterprise service bus determines that the given service name specified in the request does not exist in the registry. In this situation, the enterprise service bus may determine and construct all other possible equivalent service names for the given service name, and then use these constructed service names to inquire if a service by any one of these constructed service names exists in the registry. If the service exists in the registry with any one of the constructed service names, the enterprise service bus will be able to provide the requesting service consumer application with the address and port number of the equivalent service, even though the requested service name specified in the original service request does not exist in the registry. For example, consider a service that provides the price of a vehicle. Suppose that service is registered under the name "getVehiclePrice" in the service registry. However, there are a number of other reasonable equivalent names for the same service, such as "obtainVehiclePrice", "obtainCarPrice", "obtainAutomobilePrice", "fetchVehiclePrice", "fetchCarPrice", and "fetchAutomobilePrice". The functionality provided by the proposed enterprise service bus enables a service consumer application to use any of the constructed service names and obtain a service equivalent to the requested service. Thus, the enterprise service bus is capable of identifying services having service names equivalent to the requested service name. Consequently, in the car dealership example above, only one consumer application would need to be developed with any one of the common service names to serve all of the different car manufacturers.

Figure 3:
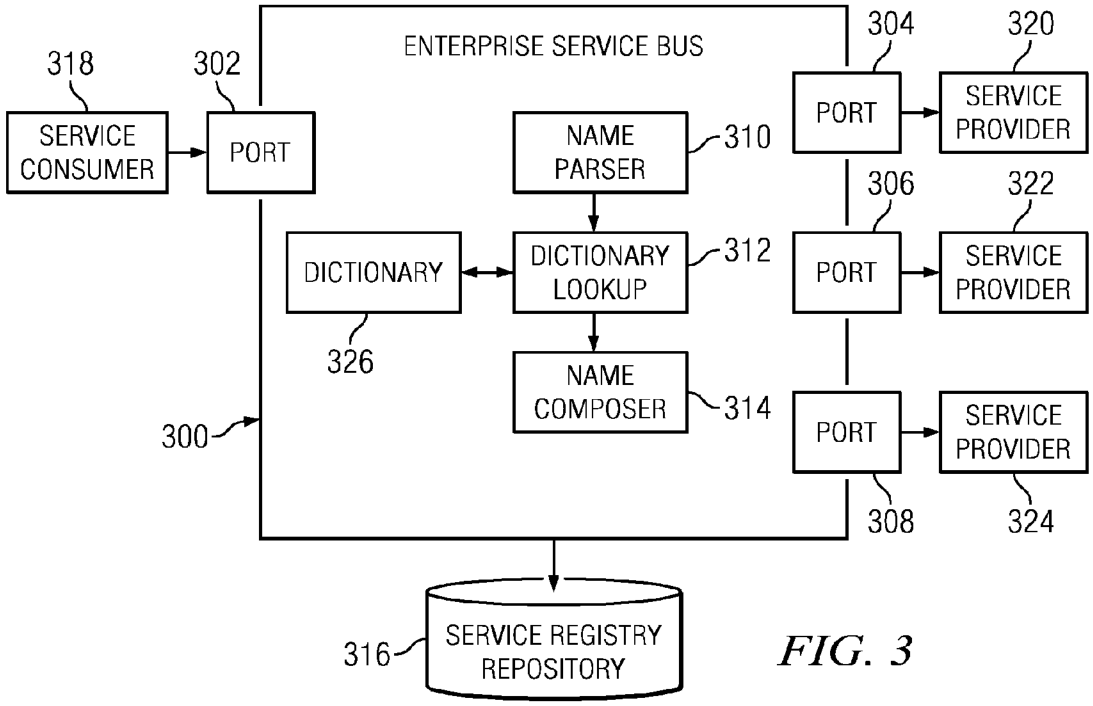
FIG. 3 is a block diagram of a enterprise service bus architecture with advanced virtualization in accordance the illustrative embodiments.

Turning now to FIG. 3, a block diagram of a system comprising an enterprise service bus architecture with advanced virtualization is shown in accordance the illustrative embodiments. The enterprise service bus architecture in FIG. 3 allows for determining equivalent service names for a service name specified in a service request from a service consumer application. The enterprise service bus may be implemented on a single server as shown or the bus may be deployed in a distributed manner, in which case various components of the enterprise service bus would be deployed on different servers, such as servers 104 and 106 in FIG. 1. These servers would be connected by a network such as network 102 in FIG. 1. In this illustrative example, enterprise service bus 300 is shown to comprise ports 302-308, name parser 310, dictionary lookup 312, and name composer 314.

Ports 302-308 comprise interface points through which service applications may connect to enterprise service bus 300. In this illustrative example, service applications include service consumer application 318 and service provider applications 320, 322, and 324. Service consumer application 318 is shown in this example to be connected to enterprise service bus 300 via port 302. Service consumer 318 uses a particular messaging format over a particular communications protocol to communicate with and send service requests to other applications connected to enterprise service bus 300. A message format defines the structure and form of the message. Examples of message formats may include, but are not limited to, Simple Object Access Protocol (SOAP) and eXtensible Markup Language (XML). A communication protocol can be defined as a set of rules governing the syntax, semantics, and synchronization of communications. Examples of communication protocols include, but are not limited to, HyperText Transfer Protocol (HTTP), Message Queue (MQ), and Internet Inter-Orb Protocol (HOP).

Port 302 provides an interface for service consumer application 318 to connect to enterprise service bus 300. Likewise, ports 304, 306, and 308 provide respective interfaces for service provider applications 320, 322, and 324 to connect to enterprise service bus 300. In one embodiment, a port may comprise a particular port type in that the port handles only messages and communications of the particular message format and communication protocol of its respective service application. In another embodiment, a port may comprise a universal port type which comprises a generic interface to enterprise service bus 300 and may handle any messaging format and communication protocol combination employed by the its respective service application. This universal port type is described in further detail in co-pending U.S. patent application Ser. No. 12/625,331, which is herein incorporated by reference in its entirety.

Service consumer application 318 sends requests for services to enterprise service bus 300 via port 302. The requests comprise requests for particular services supplied by one or more service provider applications, such as service provider applications 320, 322, or 324. As enterprise service bus 300 allows for virtualization of service consumers and providers, service consumer application 318 does not need to know the address (e.g., Internet Protocol (IP) address and port) of the service provider that may provide the requested service. Rather, service consumer application 318 specifies in the service request the service name of a desired service. Enterprise service bus 300 determines to which service provider application to route the request by accessing service registry 316. Enterprise service bus 300 looks up the address of the service provider associated with the service name in service registry 316. Service registry 316 may comprise entries that specify service names and the associated addresses of the service provider(s) that provide the services. An example of a service registry that may be employed by enterprise service bus 300 is WebSphere® Service Registry and Repository (WSRR). If the service name is located in service registry 316, enterprise service bus 300 routes the service request to service provider address associated with the located service name.

Enterprise service bus 300 also employs additional components to handle situations in which the lookup of the service name specified in the service request in service registry 316 does not yield an exact service name match. Name parser 310 is a software component that is used to parse the service name into constituent words. A constituent word serves as a part of portion of a service name, and when placed together with other constituent words, forms a complete service name. For example, for the service name "getCarPrice", each of the words, "get", "Car", and "Price" are constituent words. In one embodiment, name parser 310 may examine the service name in the request and parse the name based on naming conventions applicable to a particular programming language, such as Java® and C++. For instance in Java, a service name may comprise constituent words that are separated by a capital letter. Thus, using the example of the service name "getCarPrice", name parser 310 may determine that the service name in the request contains three constituent words—"get", "Car", and "Price" based on the capitalization of letters in the service name.

Dictionary lookup 312 is a software component employed to lookup words in a dictionary, such as dictionary 326. Dictionary 326 is run against each constituent word in the service name. Dictionary lookup 312 accesses dictionary 326 to find words that have the same or a similar meaning for each constituent word in the parsed name of the incoming service request. Dictionary lookup 312 uses these same or similar words to create lists of words equivalent to each constituent word in the parsed service name.

Dictionary 326 may comprise a general dictionary or a custom dictionary. A general dictionary may comprise all words obtained from a reference book, including definitions and associated synonyms. A custom dictionary may comprise only words, definitions, and associated synonyms that are applicable and tailored to a specific enterprise, a set of related enterprises, or to a specific type of industry. Dictionary 326 may be implemented in several ways. In the embodiment shown, dictionary 326 is implemented as an internal component enterprise service bus 300. In another embodiment, dictionary 326 may be implemented as external software which can be accessed by or connected to enterprise service bus 300. In an embodiment where dictionary 326 is implemented as external software, dictionary 326 and enterprise service bus 300 may either reside on the same server or on separate servers. If dictionary 326 runs on a separate server, dictionary 326 may be accessed by enterprise service bus 300 through a network.

Name composer 314 is a software component employed to construct all possible service names equivalent to the original service name specified in the request. Name composer 314 receives as inputs from dictionary lookup 312 the lists of synonyms for each constituent word. Name composer 314 combines words from each list in the same order as the original service request to generate constructed service names for all possible combinations of the words in the original word order. These constructed service names are equivalent to the original service name specified in the request.

For each constructed service name, enterprise service bus 300 looks up the address of the service provider associated with the constructed service name in service registry 316. If a service exists by the constructed service name, service registry 316 will return the service provider's address associated with the constructed service name. If multiple services are located in the registry that match the constructed service name, service registry 316 will return the service provider's address of the first service matching the constructed service name. Enterprise service bus 300 may then send a request for the service matching the constructed service name to the service provider address.

FIG. 4 illustrates example code utilized by name parser 310 in FIG. 3 in accordance with the illustrative embodiments. The name parser parses the original service name received in the service request into constituent words. Example code 400 illustrates how name parser may parse the service name based on naming conventions applicable to a particular programming language, such as Java® and C++. In particular, example code 400 illustrates how the service name may be parsed into constituent words using the Java naming convention of separating words by capital letters.

Example code 400 examines each character of the original service name in section 402 to determine whether the examined character is a capital letter. If the examined character is not a capital letter as in section 404, example code 400 adds the character to the current word the current word list and continues to examine the next character in the service name. If an examiner character is a capital letter as in section 406, example code 400 adds the character to a new word in a new word list. Thus, for the example service name "getCarPrice", example code 400 may determine that the service name in the request contains three constituent words—"get", "Car", and "Price" based on the capitalization of letters in the service name. Example code 400 returns the constituent words identified in the service name to dictionary lookup 312 in FIG. 3.

FIG. 5 illustrates an example dictionary database table utilized by dictionary lookup 312 in FIG. 3 in accordance with the illustrative embodiments. In one embodiment, the dictionary is implemented as a separate module in the service registry system. The dictionary comprises database-based dictionary 500, such as relational database, which comprises rows of words and their related synonyms.

Each word record is represented as a row in the dictionary database table. A word record of the dictionary database table is indexed by a primary key word and the rest of columns in the same row as the primary key word are synonyms of the primary key word. Thus, the dictionary database table should be set up to contain enough number of rows for words in the dictionary database table and enough number columns in a row for synonyms for respective words. Also, each column should be in a size enough to store a longest possible word in the dictionary database table. All words in the dictionary database table are stored as a primary key word to make the word searchable, and consequently, a word may appear more than once in different columns of the dictionary database table. The dictionary database table may be prepared using customary database products and standard query languages, such as SQL (Structured Query Language), etc.

In this illustrative example, three words (car, vehicle, automobile) are used to represent content in database-based dictionary 500, which is shown to comprise three rows 502, 504, and 506. For performance reasons, first column 508 in the database may be indexed to allow the word to be easily searched by the dictionary lookup component. Remaining columns 510 are synonyms of the word in first column 508. As shown, row 502 is indexed by the word "car" in the first column and specifies that the words "vehicle" and "automobile" are synonyms of "car". Similarly, row 504 is indexed by the word "vehicle" in the first column and specifies that words "car" and "automobile" are synonyms of "vehicle", and row 506 is indexed by the word "automobile" in the first column and specifies that words "car" and "vehicle" are synonyms of "automobile". Thus, each of the rows in database-based dictionary 500 may all comprise the same synonyms, but the first column of each of the rows will contain a different synonym. The dictionary lookup component performs a lookup in database-based dictionary 500 against each constituent word in the service name to locate all possible words equivalent to each constituent word. For example, if one of the constituent words is "vehicle", a lookup of all possible words equivalent to "vehicle" in database-based dictionary 500 will result in the words "car" and "automobile" being returned. The dictionary lookup uses the returned words to create a list of words for each constituent word. Each list of words contains the words identified as equivalent to its respective constituent word in the parsed service name.

The dictionary lookup component receives a request to look up synonyms for a constituent word. The dictionary lookup component formulates a database query to retrieve a word record for the key word from the dictionary database table. The dictionary lookup component executes the formulated database query against the dictionary database table. As a result, the dictionary process retrieves the word record for the key word from the dictionary database table or a null if there is no word record found in the dictionary database table. The dictionary lookup component returns a synonym list comprising words from the retrieved word record or a null if no word record is retrieved.

FIG. 6 illustrates an example dictionary file utilized by dictionary lookup 312 in FIG. 3 in accordance with the illustrative embodiments. In one embodiment, the dictionary file may be implemented as a separate module in the service registry system. In this example, the dictionary comprises an electronic dictionary file. Dictionary file 600 may be stored in service registry 316 in FIG. 3. Dictionary file 600 may be created to have at least one line comprising a key word followed by zero or more synonyms for the key word. Each word, either the key word or a synonym, is separated from another by a predefined delimiter. The dictionary file is stored in a storage device of a computer system on which the service registry system runs. The dictionary lookup component may create a dictionary map by indexing all synonym lists parsed with a first word in each word line to make the synonym lists searchable by the first word.

The dictionary lookup component performs a lookup using dictionary file 600 against each constituent word in the service name to locate all possible words equivalent to each constituent word. A lookup of all possible words equivalent to "vehicle" in dictionary file 600 will result in the words "car" and "automobile" being returned. The dictionary lookup uses the returned words to create a list of words for each constituent word. Each list of words contains the words identified as equivalent to its respective constituent word in the parsed service name. For example, when the dictionary lookup component receives a request to look up synonyms for a constituent word, the dictionary lookup component searches the dictionary map with the constituent word. The dictionary lookup component returns a synonym list corresponding to the key word found in the dictionary map. If no match for the key word is found, the dictionary process returns null.

The file-based dictionary embodiment yields a high performance search functionality comparing to a database-based dictionary, because the entire dictionary is in the computer memory. The file-based dictionary embodiment is more easily integrated with the service registry system than dictionaries implemented with a relational database because an application program utilizing the file-based dictionary is customized without being limited to queries and tools specific to a database employed for a database-based dictionary.

To further the performance of search functionalities, the dictionary may have sub-categories according to content of the dictionary. Examples of sub-categories of the dictionary may be, inter alia, a dictionary of organization-specific terms, a dictionary of industry-specific terms, and a dictionary of general terms, etc. Because the number of terms to look up is limited as the dictionary contains only a small number of relevant terms in searching a service name, a search request for the service name in the service registry system is performed more efficiently.

Also, the file-based dictionary is more easily expandable as necessary, as opposed to a database-based dictionary of which schema is fixed at the time of designing the database-based dictionary. The file-based dictionary is expandable in terms of not only the number of words that are listed in the dictionary but also the length of an individual word that is listed in the dictionary. Consequently, synonyms in the file-based dictionary are not limited in length, and any user-defined term of various lengths can be listed in the dictionary.

FIG. 7 illustrates example code utilized by a name composer component of the enterprise service bus in accordance with the illustrative embodiments. The name composer constructs all possible service names equivalent to the original service name specified in the request. Example code 700 illustrates how the name composer may obtain words 702 from each list received by the dictionary lookup component and combine these words 704 in the same order as the words in the original service request to generate a constructed service name. The name composer constructs equivalent service names for all possible combinations of words in the lists of words in the particular order of words in the service request. These constructed service names are equivalent to the original service name specified in the request.

Figure 8:
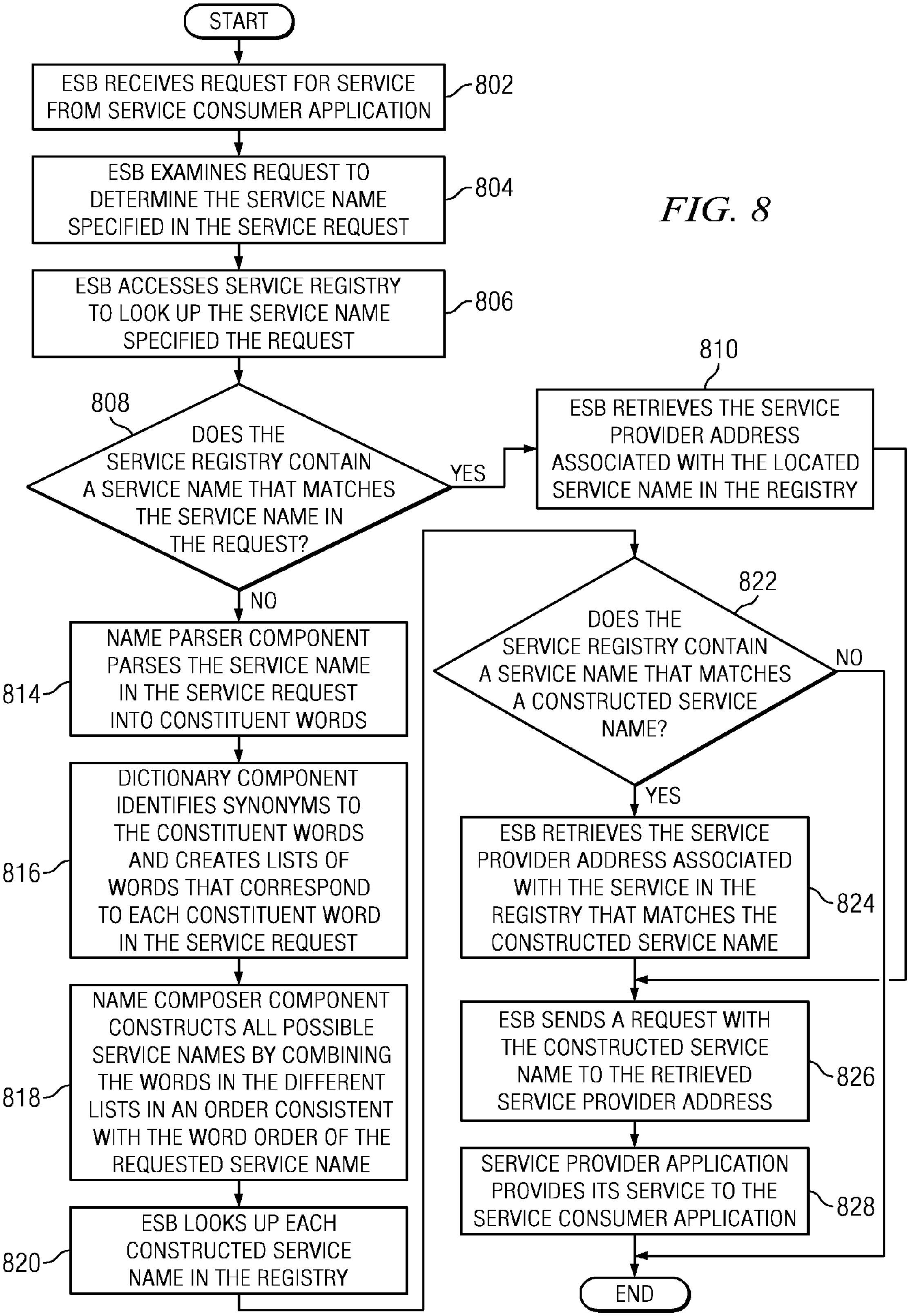
FIG. 8 is a flowchart of a process in an enterprise service bus for discovering all services in a service registry that provide a service equivalent to a service name specified in a service request in accordance with the illustrative embodiments.

FIG. 8 is a flowchart of a process in an enterprise service bus for discovering all equivalent services corresponding to a registered service name in a service request in accordance with the illustrative embodiments. The process described in FIG. 8 may be implemented using enterprise service bus 300 shown in FIG. 3.

The process begins with the enterprise service bus receiving a request for a service from a service consumer application (step 802). The enterprise service bus examines the service request to determine the service name specified in the service request (step 804). Once the enterprise service bus determines the service name in the request, the enterprise service bus accesses the service registry to look up the service name in the registry (step 806). The enterprise service bus then makes a determination as to whether a service exists in the service registry that has the exact service name as specified in the service request (step 808). If the registry contains a service name that matches the service name in the service request ('yes' output of step 808), the enterprise service bus retrieves the service provider address associated with the located service name in the registry (step 810). The enterprise service bus then sends the service request to the retrieved service provider address (step 826). The service provider application receiving the request may provide its service to the service consumer application (step 828).

Turning back to step 808, if the registry does not contain a service name that matches the service name in the service request ('no' output of step 808), the enterprise service bus employs a name parser component to parse the service name in the service request into constituent words (step 814). For each constituent word identified in the service name, the enterprise service bus employs a dictionary component to identify words that have the same or similar meaning as the parsed words and create lists of words, each list corresponding to a constituent word in the service name of the service request (step 816). Once the lists of comparable words are determined for each constituent word in the original service name, the enterprise service bus employs a name composer component to generate all possible equivalent service names by combining the words in different lists in an order consistent with the original service name order (step 818).

Next, the enterprise service bus will attempt to look up each constructed service name in the registry (step 820). The enterprise service bus then makes a determination as to whether a service exists in the service registry that has the same service name as a constructed service name (step 822). If the registry contains a service name that matches a constructed service name ('yes' output of step 822), the enterprise service bus retrieves the service provider address associated with the first located constructed service name in the registry (step 824). The enterprise service bus then sends a request for the service matching the constructed service name to the retrieved service provider address (step 826). The service provider application receiving the request may then provide its service to the service consumer application (step 828).

Turning back to step 822, if the registry does not contain a service name that matches a constructed service name ('no' output of step 822), the enterprise service bus may return NULL to the service requester, with the process terminating thereafter.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in an enterprise service bus for discovering services in a service registry, the computer implemented method comprising:

receiving, by the enterprise service bus, a request for a service from a service consumer application;

determining a service name specified in the service request;

querying the service registry for the service name;

responsive to a determination that the service registry does not contain a service matching the service name, parsing the service name in the service request into at least one constituent word;

obtaining synonyms for each constituent word;

constructing new service names using the synonyms in a word order matching the service name to form constructed service names;

querying the service registry for the constructed service names;

responsive to locating a service matching a constructed service name in the service registry, obtaining an address of a service provider application associated with the constructed service name in the service registry; and sending a request for the service matching the constructed service name to the service provider application.

2. The computer implemented method of claim 1, wherein parsing the service name in the service request into at least one constituent word is performed by a name parser component in the enterprise service bus, and wherein the name parser component parses the service name based on service naming conventions.

3. The computer implemented method of claim 1, wherein obtaining synonyms for each constituent word is performed by a dictionary lookup component within the enterprise service bus, and wherein the dictionary lookup component retrieves synonyms for each constituent word in a dictionary and creates a synonym list for each constituent word.

4. The computer implemented method of claim 3, wherein the dictionary is a custom dictionary comprising only words, definitions, and associated synonyms applicable to a specific enterprise, a set of related enterprises, or a specific type of industry.

5. The computer implemented method of claim 3, wherein the dictionary is a file-based dictionary comprising a dictionary map, wherein the dictionary map comprises at least one word line, wherein each word line of the at least one word line comprises a respective index word and zero or more synonyms of the respective index word.

6. The computer implemented method of claim 5, wherein retrieving synonyms and creating a synonym list for each constituent word further comprises:

selecting a first constituent word of the service name;

discovering an index word of the dictionary map that matches the first constituent word;

storing a word line of the dictionary map that begins with the discovered index word to a first synonym list; and repeating the selecting, discovering, and storing for each constituent word in the service name.

7. The computer implemented method of claim 5, wherein constructing new service names further comprises:

replacing a first constituent word of the service name with a first synonym from a first synonym list, wherein the first synonym list comprises zero or more synonyms of the first constituent word;

storing a result from the replacing to a first constructed service name;

iterating the replacing and storing for each synonym in the first synonym list of the first constituent word; and repeating the iterating for another synonym list of another constituent word of the service name.

8. The computer implemented method of claim 3, wherein the dictionary is a dictionary database, wherein the dictionary database comprises at least one record, wherein each record comprises a respective primary key and zero or more synonyms of the primary key.

9. The computer implemented method of claim 8, wherein retrieving synonyms and creating a synonym list for each constituent word further comprises:

composing a first database query that retrieves a first record from the dictionary database, wherein the primary key of the first record matches a first constituent word of the service name;

executing the first database query against the dictionary database;

storing the first record acquired from the executing to a first synonym list; and iterating the composing, executing, and storing for each constituent word in the service name.

10. The computer implemented method of claim 8, wherein constructing new service names further comprises:

replacing a first constituent word of the service name with a first synonym from a first synonym list, wherein the first synonym list comprises zero or more synonyms of the first constituent word;

storing a result from the replacing to a first constructed service name;

iterating the replacing and storing for each synonym in the first synonym list of the first constituent word; and repeating the iterating for another synonym list of another constituent word of the service name.

11. The computer implemented method of claim 1, wherein the enterprise service bus is connected to the service consumer application via a universal port type that handles messages and communications in any message format and communication protocol.

12. A computer program product in an enterprise service bus for discovering services in a service registry, the computer program product comprising:

a computer readable storage medium having computer readable program code stored thereon, the computer readable program code for execution by a computer, comprising:

computer readable program code for receiving, by the enterprise service bus, a request for a service from a service consumer application;

computer readable program code for determining a service name specified in the service request;

computer readable program code for querying a service registry for the service name;

computer readable program code for responsive to a determination that the service registry does not contain a service matching the service name, parsing the service name in the service request into at least one constituent word;

computer readable program code for obtaining synonyms for each constituent word;

computer readable program code for constructing new service names using the synonyms in a word order matching the service name to form constructed service names;

computer readable program code for querying the service registry for the constructed service names;

computer readable program code for responsive to locating a service matching a constructed service name in the service registry, obtaining an address of a service provider application associated with the constructed service name in the service registry; and computer readable program code for sending a request for the service matching the constructed service name to the service provider application.

13. The computer program product of claim 12, wherein the computer readable program code for obtaining synonyms for each constituent word is performed by a dictionary lookup component within the enterprise service bus, and wherein the dictionary lookup component retrieves synonyms for each constituent word in a dictionary and creates a synonym list for each constituent word.

14. The computer program product of claim 13, wherein the dictionary is a file-based dictionary comprising a dictionary map, wherein the dictionary map comprises at least one word line, wherein each word line of the at least one word line comprises a respective index word and zero or more synonyms of the respective index word.

15. The computer program product of claim 14, wherein the computer readable program code for retrieving synonyms and creating a synonym list for each constituent word further comprises:

computer readable program code for selecting a first constituent word of the service name;

computer readable program code for discovering an index word of the dictionary map that matches the first constituent word;

computer readable program code for storing a word line of the dictionary map that begins with the discovered index word to a first synonym list; and computer readable program code for repeating the selecting, discovering, and storing for each constituent word in the service name.

16. The computer program product of claim 14, wherein the computer readable program code for constructing new service names further comprises:

computer readable program code for replacing a first constituent word of the service name with a first synonym from a first synonym list, wherein the first synonym list comprises zero or more synonyms of the first constituent word;

computer readable program code for storing a result from the replacing to a first constructed service name;

computer readable program code for iterating the replacing and storing for each synonym in the first synonym list of the first constituent word; and computer readable program code for repeating the iterating for another synonym list of another constituent word of the service name.

17. The computer program product of claim 13, wherein the dictionary is a dictionary database, wherein the dictionary database comprises at least one record, wherein each record comprises a respective primary key and zero or more synonyms of the primary key.

18. The computer program product of claim 17, wherein the computer readable program code for retrieving synonyms and creating a synonym list for each constituent word further comprises:

computer readable program code for composing a first database query that retrieves a first record from the dictionary database, wherein the primary key of the first record matches a first constituent word of the service name;

computer readable program code for executing the first database query against the dictionary database;

computer readable program code for storing the first record acquired from the executing to a first synonym list; and computer readable program code for iterating the composing, executing, and storing for each constituent word in the service name.

19. The computer program product of claim 17, wherein the computer readable program code for constructing new service names further comprises:

computer readable program code for replacing a first constituent word of the service name with a first synonym from a first synonym list, wherein the first synonym list comprises zero or more synonyms of the first constituent word;

computer readable program code for storing a result from the replacing to a first constructed service name;

computer readable program code for iterating the replacing and storing for each synonym in the first synonym list of the first constituent word; and computer readable program code for repeating the iterating for another synonym list of another constituent word of the service name.

20. An apparatus comprising:

a bus;

a storage device connected to the bus, wherein the storage device contains computer usable code; and a processing unit connected to the bus, wherein the processing unit executes the computer usable code to receive a request for a service from a service consumer application; determine a service name specified in the service request; query the service registry for the service name; responsive to a determination that the service registry does not contain a service matching the service name, parse the service name in the service request into at least one constituent word; obtain synonyms for each constituent word; construct new service names using the synonyms in a word order matching the service name to form constructed service names; query the service registry for the constructed service names; responsive to locating a service matching a constructed service name in the service registry, obtain an address of a service provider application associated with the constructed service name in the service registry; and send a request for the service matching the constructed service name to the service provider application.

* * * * *